Aug. 13, 1957  A. D. YOUNG  2,802,393
INSPECTION METHOD AND APPARATUS
Filed Aug. 17, 1955  4 Sheets-Sheet 1
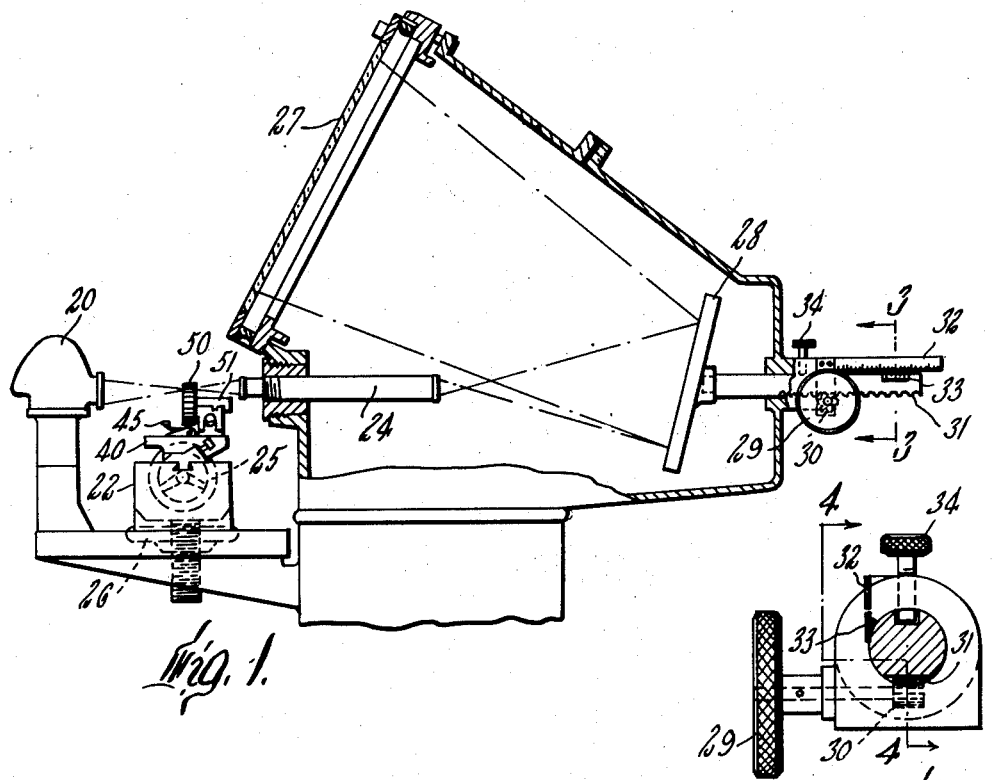
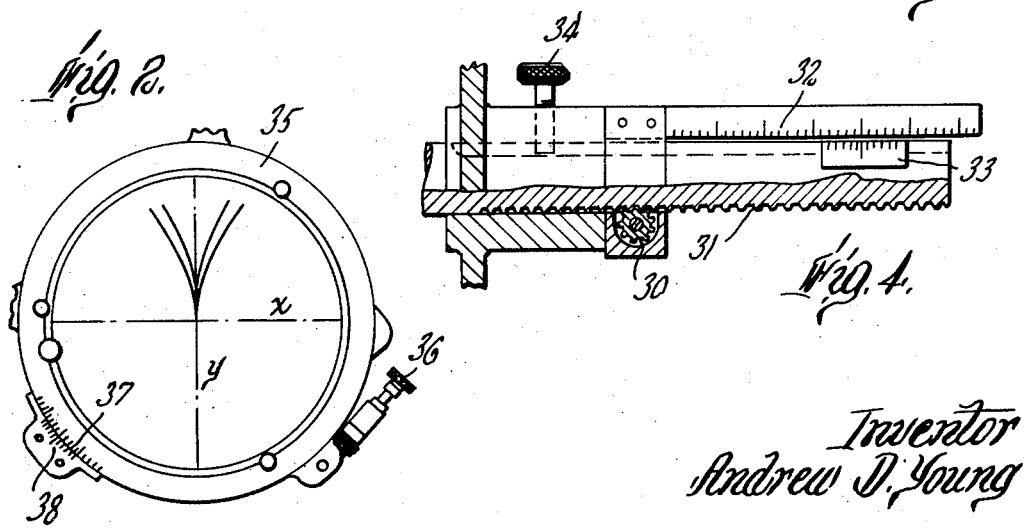
Inventor
Andrew D. Young
Wm O Moeser Atty.

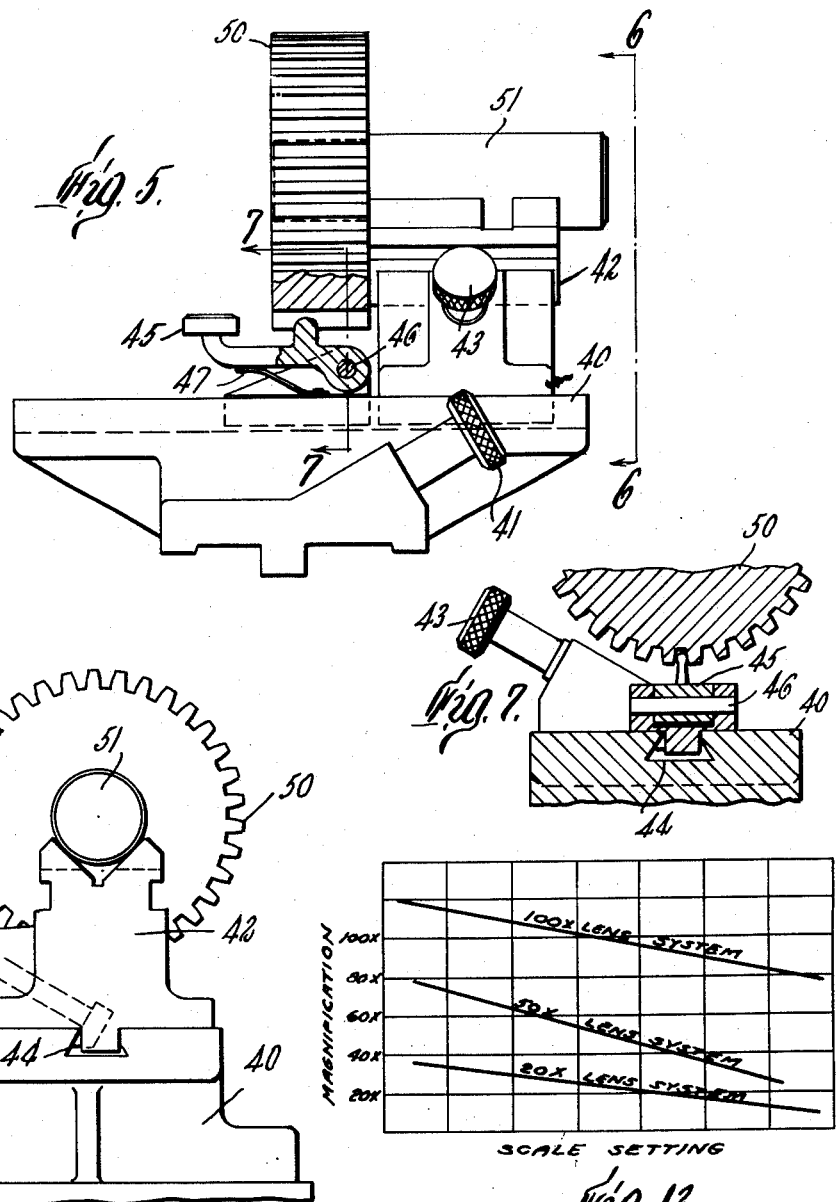

Inventor
Andrew D. Young

United States Patent Office 2,802,393
Patented Aug. 13, 1957

2,802,393

INSPECTION METHOD AND APPARATUS

Andrew D. Young, New Hyde Park, N. Y., assignor to Jones and Lamson Machine Company, a corporation of Vermont Application August 17, 1955, Serial No. 528,970

4 Claims. (Cl. 88—24)

My invention relates to inspection methods and apparatus, and relates more particularly to a method and means for inspecting and analyzing involute forms as are often encountered in gears, splines and the like.

Heretofore many methods have been proposed for the analysis of involutes. In the case of gears, the accuracy of the involute form on the teeth is very important since the shape of the gear teeth controls and determines the manner in which power flows between two intermeshing gears. Many of these methods have merely measured the total effect of a gear in operation and have not afforded means for analyzing completely the involute forms themselves, their position, spacing and other aspects of gear geometry. Information on each of these variables is required for correction or adjustment of the process by which the forms were produced.

Optical comparators have from time to time been used for the projection of involute forms and for comparison of the enlarged image with a master form or forms on a receiving screen or chart. Such a machine is shown generally and described in U. S. Patent No. 2,031,201 granted to R. O. Beardsley.

Gears, splines and involute forms of all types are, of course, produced in industry in a wide variety of sizes. In the inspection of any given form, it has heretofore been necessary, if the inspection was being done optically, to produce a master chart of the particular form to be inspected. This, of course, required a chart drawn to the proper magnification for every type and size of gear or spline being inspected. In accordance with the present invention, a method and means are herein proposed which will permit the use of a single master chart to inspect a wide range of sizes of gears and other involute forms. With this single master chart and the method hereinafter disclosed, a complete anlysis of the form can be made. The method will be described with particular reference to spur gears by way of illustration although it should be understood that the method is equally applicable to all types of similar forms.

According to the principles of involutometry, the involute form is generated from an evolute or base circle which is the basic reference element in the design and construction of any gear. In accordance with my invention, I provide a comparator chart on which may be located a plurality of involute forms, each one generated from a given evolute or standard base circle. By varying the magnification of the comparator or other optical instrument to a suitable value, I propose to bring the evolute of the gear being inspected into registry with a chosen standard evolute from which the chart involute was derived. In this way I can compare the tooth of any given gear with a standard master chart outline and examine the same for involute form, tooth thickness, tooth spacing, orientation and centrality of the gear tooth with respect to radial lines emanating from the theoretical center of the gear itself.

With this method, various types of errors which are commonly encountered in the production of gears can be separated, individually analyzed and measured. This information, of course, is indispensable for the effective correction and adjustment of the machine tool on which the gear was produced.

It is therefore a principle object of my invention to provide a method of and means for completely inspecting and analyzing involute forms.

It is a further object of my invention to provide means for inspecting involute forms which entail the use of a minimum amount of equipment and a single standard of reference regardless of the size of the particular form being inspected.

It is yet another object of this invention to make novel application of the principles of geometry in conjunction with novel apparatus for ready inspection of gears and the like.

These and other objects and advantages of my invention will become readily apparent to persons skilled in the art from a study of the following detail specification and the accompanying drawings in which Figure 1 is a side elevation, partly schematic and partly in section, of an optical comparator illustrating the general seting of my invention;

Figure 2 illustrates a comparator chart which is used with the comparator shown in Figure 1;

Figure 3 is a detailed view taken on the line 3—3 of Figure 1;

Figure 4 is a detailed view of the mirror scale taken on the line 4—4 of Figure 3;

Figure 5 is a side elevation of a staging fixture for mounting work pieces in accordance with the invention;

Figure 6 is an end view of the fixture shown in Figure 5;

Figure 7 is a sectional detailed view taken on the line 7—7 of Figure 5;

Figure 13 is a graph useful in adjusting the machine shown in Figure 1 in accordance with the invention.

Figure 8:
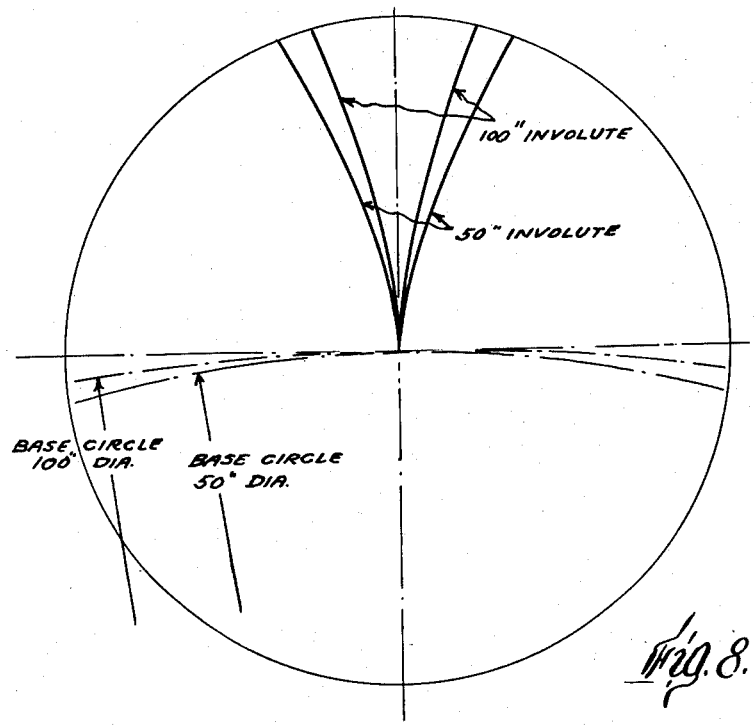
Figure 8 is a schematic diagram illustrating how the chart lines shown in Figure 2 are developed.

Referring now more particularly to Figure 1, an optical comparator is shown having a lamp house 20 containing a suitable light source, a staging table 22, and an objective lens system 24. The table is movable longitudinally and vertically by means of hand wheels 25 and 26 respectively. The image of the object to be inspected is cast on a ground glass chart 27 by means of an optically flat reflecting surface on a mirror 28. This mirror is movable toward and from the objective lens 24 and it will be seen that the position of the mirror 28 determines the degree of magnification obtainable with a given lens system. Thus, as the mirror is moved to the left toward the lens, the magnification is decreased, and as the mirror is moved to the right away from the lens, the magnification is increased.

The magnification change with mirror movement is a liner function. The mirror 28 is moved by operation of a convenient knurled hand wheel 29 operating a rack and pinion combination shown more particularly in Figures 3 and 4. Rotation of a pinion 30 operates in conjunction with a rack 31 to move the mirror 28 in or out as desired by the operator. The position of the mirror may be read on a scale 32 marked off in suitable units, and fine adjustment of the mirror setting may be made with the aid of a vernier 33. After final adjustment the mirror may be secured in place by means of a clamping screw 34.

The comparator chart 27 is mounted in a chart ring 35 which is adjustable to any desired angular position by means of a knurled hand wheel 36 shown more particularly in Figure 2.

The exact angular position of the chart may be read on a scale 37 inscribed on the chart ring as shown in Figure 2. Fine settings of the angular position of the chart may be made with the aid of a vernier 38.

On the chart of Figure 2 are shown two pairs of involute lines inscribed thereon and having their origins at the center point of the chart at the intersection of the X and Y axes. These involute curves are developed from base circles as shown more particularly in Figure 8. I have chosen to show two standard base circles, 100" and 50" in diameter respectively. The centers of these base circles lie on the Y axis of the chart at such a distance below the chart center that these circles are tangent to the X axis of the chart when the chart is placed in its zero position. Right-hand and left-hand involute curves are developed from the 100" circle and similarly right-hand and left-hand curves are developed from the 50" circle. It should be understood that other constants may be used in accordance with this invention, but the values shown here are convenient for illustrative purposes. Also the base circles and their reference points are used only for chart layout purposes, and only the involute lines themselves need be actually placed on the finished chart.

It will be remembered that the origins of all these involutes lie at the intersection of the X and Y axes on the chart.

Figures 5, 6 and 7 illustrate one convenient staging fixture for use in accordance with my invention. On the comparator table 25 is set a mounting block 40 which may be clamped into position on the comparator table by means of knurled knob 41. On the mounting block 40 is mounted a V block 42 which may be clamped into any desired position by means of a knurled knob 43 cooperating with a dovetail groove 44 in the mounting block 40. Also in this groove 44 may be positioned a pawl member 45 which is biased upwardly about a pivot 46 by means of a spring 47.

The pawl 45 is adapted to engage a gear 50 which is the work piece to be inspected in this illustration. The gear 50 may be mounted on a precision arbor 51 which rests in the V block 42, all as shown.

It will be appreciated that by means of hand wheels 25 and 26 which may be calibrated in the usual manner, the entire table assembly carrying the gear 50 may be moved in the light beam from the lamp house 20 to measured positions, all with respect to the master chart 27. By depressing the pawl 45 against the spring 47, the gear may be indexed from tooth to tooth, each step bringing a new gear tooth into proper alignment for inspection, all as will hereinafter appear.

A general case will now be developed to illustrate a method of operation of my invention and a specific example will then be set forth by way of illustration.

Figure 12:
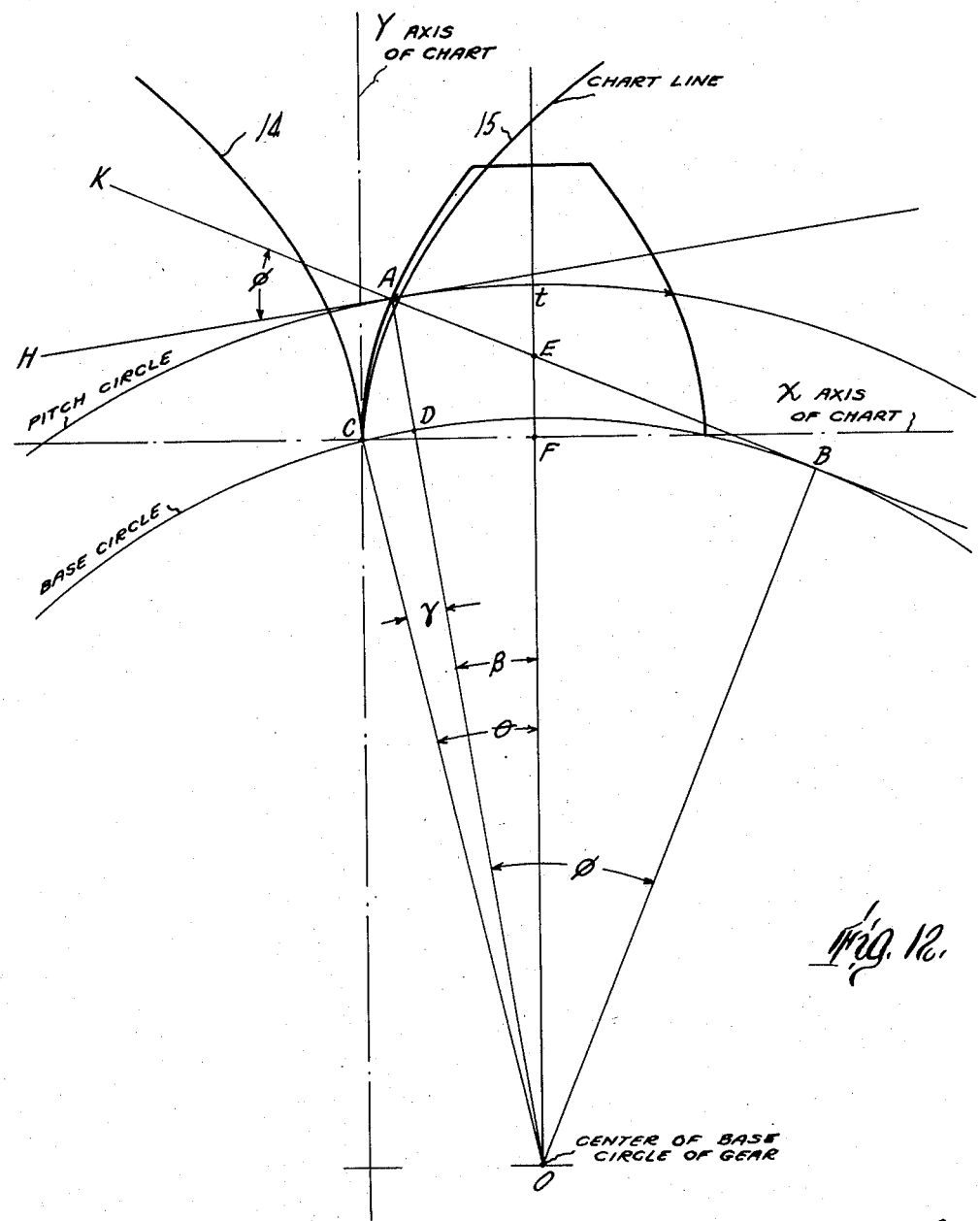
Figure 12 is a diagram useful in setting forth the mathematical basis of the invention.

Referring now more particularly to Figure 12, let X and Y be the axes of a coordinate system on the screen of an optical comparator of the type referred to above. A gear has been so staged on the comparator table that a tooth profile appears enlarged on the screen as shown. The staging is such that an origin of the gear tooth involute (that is, the intersecting point of the involute curve with the gear base circle) is at the origin of the coordinate system formed by the X and Y axes. This point is hereinafter referred to as the chart origin.

Also emanating from the chart origin is a master involute represented by chart line 15 which is inscribed on the comparator screen. This involute was generated from a 100" base circle, having its center on the Y axis of the chart 50" below the chart origin C, such that the 100" base circle is tangent to the X axis at the origin, as explained above in connection with Figure 8.

The gear tooth image is first centralized on the Y axis by appropriate adjustment of the staging fixture and comparator table. The gear image is then moved to the right along the X axis by the amount $\overline{CF}$ in Figure 11. The image, starting with the gear center 0 on the chart origin, is also moved downwardly by the amount $\overline{OF}$.

These adjustments move the center point of the gear to the right of the Y axis on which the center of the 100" circle lies. Therefore, a corrective counter-clockwise rotational movement of the chart through angle $\theta$ is required. Figure 12 shows the image after the two coordinate adjustment, but before rotation of the chart. After final angular adjustment through angle $\theta$, the chart line 15 will coincide exactly with the side of the gear tooth image if the tooth is correctly formed. Deviations from the true form are readily seen and measured.

The foregoing adjustments are easily made and their values are determined by computation for a given gear as follows:

Assume a spur gear as a general case:

Pressure angle $=\theta$
Base circle radius $=Rb$
Pitch circle radius $=R$
Tooth thickness at $=t$
Number of teeth $R=N$ Then, from Figure 1 it is evident that angle HAK is the pressure angle of the gear and is denoted $\phi$. Also angle BOD = angle HAK since OB⊥KB and HA⊥AO. Therefore, angle BOD equals the pressure angle and is also denoted $\phi$ in Figure 1.

The following relationships are also evident from Figure 1:

1. $$\phi = \frac{t}{2R} \cdot \frac{360}{2\pi}$$

2. $$\overline{AB} = R \sin \phi$$

3. $$\overparen{CB} = \overline{AB}$$

4. $$\phi + \gamma = \frac{\overparen{CB}}{Rb} \cdot \frac{360}{2\pi}$$

or, substituting from line 3, Equation 4 becomes

5. $$\phi + \gamma = \frac{AB}{Rb} \cdot \frac{360}{2\pi}$$

and substituting from line 2,

6. $$\phi + \gamma = \frac{R \sin \phi}{Rb} \cdot \frac{360}{2\pi}$$

and subtracting $\phi$,

7. $$\gamma = \frac{R \sin \phi}{Rb} \cdot \frac{360}{2\pi} - \phi$$

8. $$\theta = (\beta + \gamma)$$

or

9. $$\theta = \frac{t}{2R} \cdot \frac{360}{2\pi} + \frac{R \sin \phi}{Rb} \cdot \frac{360}{2\pi} - \phi$$

Therefore, the horizontal adjustment of the image becomes

10. $$\overline{CF} = Rb \sin \theta$$

and the vertical adjustment is

11. $$\overline{OF} = Rb \cos \theta$$

and chart adjustment is the angle $\theta$.

The foregoing coordinate adjustments place the origin of the image involute on the same point as the origin of the chart involute, and the chart rotation through $\theta$ brings the chart involute line 15 to the theoretically correct position at which the line 15 and the form of the tooth image may be compared.

If tooth thickness at R equals tooth spacing at R, then the angle beta becomes, simply 12. $$\beta = \frac{360}{4N}$$

For a practical example of the operation of my method, assume a gear as follows:

Pressure angle _____ 20°
Number of teeth _____ 150
Pitch circle radius _____ .520″
Base circle radius _____ .4886

Using the chart involute 15 generated from a base circle of 100″ diameter, the magnification to be used in this example is:

$$\frac{100}{.9773} = 102.3$$

At 102.3 magnifications, the image of the involute of this particular gear is the same size as the chart line involute 15.

The mirror is then set to the appropriate position, using the scale, to provide this magnification of 102.3. In practice, a standard 100X lens is used to minimize the amount of mirror adjustment required. This setting may be facilitated by reference to a graph, Figure 13, which I provide and from which the correct setting is easily read.

The gear is then staged in the fixture such that its center coincides with the center of the chart, and a given tooth is centralized on the Y axis. Adjustments from this initial setting are derived as follows:

$$\beta = \frac{360}{4N} = \frac{360}{600} = .6°$$

$$\gamma = \frac{R \sin \phi}{Rb} \cdot \frac{360}{2\pi} - \phi$$

$$\gamma = \frac{.52 \sin 20°}{.4886} \cdot \frac{360}{2\pi} - 20° = .85°$$

The computation of $\beta$ above assumes that tooth thickness, $t$, equals tooth spacing at the pitch line. If the gear specifications call for other values, $\beta$ may be computed in accordance with Equation 1 above.

Therefore, $$\theta = \beta + \gamma = 1.45°$$

or $$\theta = 1° 27'$$

From Equation 10, the horizontal adjustment is:

$$Rb \sin 1° 27' = .0124''$$

From Equation 11 the vertical adjustment is $$Rb \cos 1° 27' = .4884''$$

The chart is then turned counter-clockwise through 1° 27′ and the shadow image and master chart outline are now in proper position relative to each other for comparison.

Figure 9:
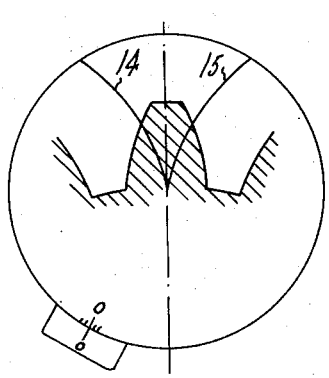
Figures 9, 10 and 11 are representations of images and their placement on the comparator chart.
Figure 10:
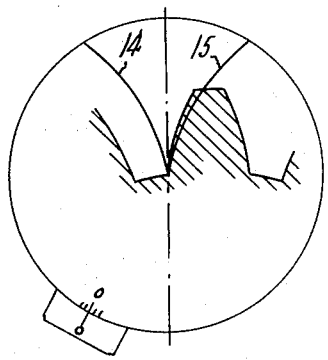
Figure 11:
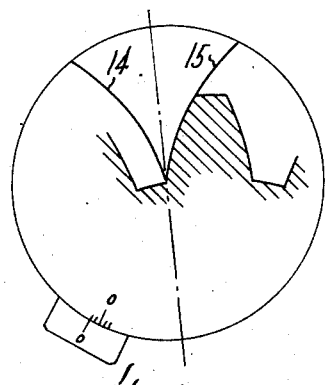

The foregoing adjustments result in image placements as shown in Figures 9, 10 and 11. Figure 9 shows the image after centralizing a tooth, with the vertical adjustment $\overline{OF}$ already made. After horizontal adjustment the image appears as shown in Figure 10. After chart rotation through computed angle $\theta$, the image appears as shown in Figure 11. The image in Figure 11 is seen to coincide exactly with the chart line 15, thus confirming that the tooth was correctly formed.

Successive teeth may be brought into position for comparison with the chart by rotating the gear 50 on its arbor 51, with the pawl locking the gear in indexed position.

Deviations from the ideal form may be noted and measured by means of calibrated handwheels 25 and 26. Thus, if the tooth is too thin, the amount of undersize may be measured by moving the image to the left until it reaches the line 15. The amount moved, read on calibrated handwheel 25, indicates the degree of undersize. Similarly, a thick tooth would require image movement to the right to bring the image into registry with the line 15. Deviations from true form are readily noted where the image does not meet the line at all points.

By reversing the sign of the chart rotation ($\theta$) and horizontal adjustment ($\overline{CF}$) described above in adjusting the gear, the image may be moved to the left of the Y axis, whereby the other side of a tooth may be compared with the mirror image 14 of chart line 15.

In this manner, tooth thickness, spacing, and form may be conveniently measured and analyzed. In addition, and at the same time, gear runout through 360° of rotation may be checked by comparing the top of each tooth image with a reference line on the chart. In such a case a grid overlay may be superimposed on the chart to provide reference points for any size of gear within the range of the comparator.

With the method described in detail above, persons skilled in the art may measure gears in such a way that correct conclusions may be drawn concerning each variable encountered. Such information is indispensable for control of future production as well as for rejection of defective work pieces. With high magnifications, great accuracy now demanded in present-day manufacture of small pinions is assured.

While I have described my invention with reference to a particular application, it is pointed out that adaptations to meet given conditions will occur to persons skilled in the art who have understood the teaching herein.

Accordingly, the foregoing is by way of illustration rather than limitation, and I intend to comprehend variations within the spirit and scope of the appended claims.

I claim:

1. A method for inspecting an object having an involute form comprising projecting an image of said form onto a chart for comparison with a master involute at a magnification which is the ratio of the master evolute to the object evolute, orienting such object in relation to said master such that the image involute origin coincides with the master involute origin at the center of rotation of said chart, and rotating said chart about the master involute origin.

2. A device for inspecting the involute form on gear teeth comprising means for projecting an image of said form at a predetermined magnification onto a rotatable receiving screen, a master involute line on said screen having its origin on the axis of rotation of said screen, means for superimposing the involute origin of said image on the involute origin of said master line, and means for rotating said screen through a predetermined angle.

3. In a system for inspecting the involute form of a gear tooth on a gear with an optical comparator having a projection path defined by a light source, a lens system, a mirror, and a rotatable image receiving screen, means for staging said gear relative to said projection path such that the origin of the image of said involute form lies at the center of rotation of said screen, a standard involute on said screen having its origin at said center, means for adjusting the magnification of said comparator to a value which is the ratio of the diameter of the base circle of said standard involute to the diameter of the base circle of said gear, and means for rotating and indicating the angular position of said screen.

4. A system according to claim 3 in which the magnification of the comparator is adjusted by moving the mirror to change the length of the projection path.

References Cited in the file of this patent
UNITED STATES PATENTS

| | | |
|---|---|---|
| 1,789,009 | Luce | Jan. 13, 1931 |
| 2,414,867 | Gradisar | Jan. 28, 1947 |
| 2,437,898 | Swanson | Mar. 16, 1948 |
| 2,465,010 | Cooke | Mar. 22, 1949 |
| 2,485,355 | Brennan | Oct. 18, 1949 |